(No Model.)
F. C. PLUME.
COUPLING FOR ELECTRIC CONDUCTORS.
No. 359,982. Patented Mar. 22, 1887.
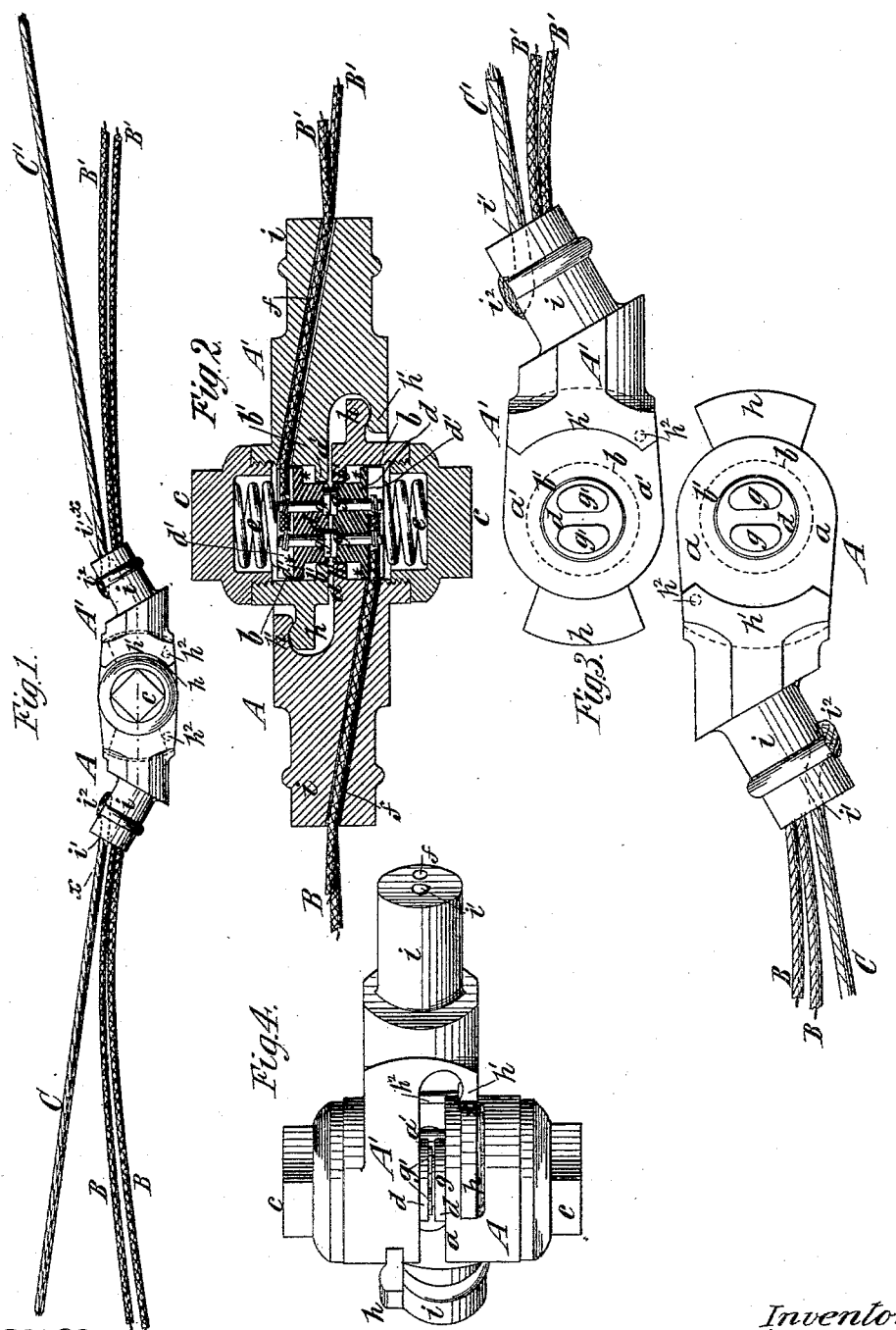

United States Patent Office.

FRANK C. PLUME, OF THOMASTON, CONNECTICUT.

COUPLING FOR ELECTRIC CONDUCTORS.

SPECIFICATION forming part of Letters Patent No. 359,982, dated March 22, 1887.

Application filed April 20, 1885. Serial No. 163,920. (No model.)

*To all whom it may concern:*

Be it known that I, FRANK C. PLUME, of Thomaston, in the county of Litchfield and State of Connecticut, have invented a new and useful Improvement in Couplings for Electric Conductors, of which the following is a specification.

My invention relates to couplings for electric conductors which are composed of two sections, with which the conductor-sections are connected, and each of which is provided with electric contact-pieces, forming a closed circuit between the conductor-sections when the coupling-sections are connected together, the said coupling-sections being so held in engagement with each other that they will be separated without injury to the conductor-sections when the coupling-sections are subjected to a severe strain tending to pull them apart.

The invention consists in novel combinations of parts in a coupling of the kind above described, which are hereinafter described, and pointed out in the claims.

In the accompanying drawings, Figure 1 represents a side view of a coupling embodying my invention, together with portions of electric conductors coupled thereby, and portions of a wire cable, whereby the coupling is sustained and the strain taken off the electric conductors. Fig. 2 represents a sectional view of the coupling upon the plane of the dotted line $x$ $x$, Fig. 1, but on a larger scale. Fig. 3 represents a face view of the two parts of the coupling disconnected from each other, and Fig. 4 represents the two parts of the coupling in the position in which they are placed preparatory to engaging one with another. Figs. 3 and 4 are upon the same scale as Fig. 2.

Similar letters of reference designate corresponding parts in all the figures.

A A' designate the two parts or sections of which the coupling is composed, and which are fac-similes of each other.

B B and B' B' designate sections of electric conductors which are to be joined by my coupling, and which may have suitable insulating-covering applied to them.

C C' designate two sections of rope or cable, which preferably consist of wire rope, and which also are connected, respectively, with the two halves or parts of the coupling.

In placing electric conductors connected by this coupling in a line of cars it is my intention to have the rope or cable sections C C' so supported or fastened in the cars that they will, when the apparatus is arranged in position, be considerably tighter than the conductor-sections B B', and will therefore sustain the weight of the couplings to relieve the conductors of all strain incident to such weight. The wires or connections C C' are not indispensable, and in some cases the electric conductors B B' may be used alone, and serve not only to conduct the electric current, but also to sustain the weight of the coupling A A'.

The internal construction of the parts of the coupling will be best understood from Fig. 2, to which I now refer.

The two parts of the coupling have at one side flat faces $a$ $a'$, which, when the parts of the coupling are connected, lie parallel with each other, and in each of which is a hole or socket, $b$, closed at the back of the coupling by a plug or bonnet, $c$. At the faces $a$ $a'$ of the coupling-sections the holes or sockets $b$ have inwardly-projecting flanges $b'$, and within such holes or sockets are arranged plugs or pieces $d$, of rubber or other suitable insulating material. The plugs or pieces $d$ are each of them shouldered at *, and have at their backs springs $e$, which act to push them inward relatively to the sockets or bores wherein they are fitted, and when the sections of the coupling are not coupled together the springs $e$, by their pressure on the plugs or pieces $d$, of insulating material, force them outward, bringing the shoulders * to bear on the flanges $b'$, and causing the faces of such plugs to project considerably beyond the flat faces $a$ $a'$ of the coupling-sections.

The conductors B B' are inserted through holes or passages $f$ in the two sections of the coupling, and are connected with contact-pieces $g$ $g'$, which are embedded in the insulating plugs or pieces $d$, and which project slightly beyond the face of these plugs or pieces, so that when the two coupling-sections are connected, as shown in Fig. 2, the contact-pieces $g$ in one section will be in close metallic contact with the metallic pieces in the other section, and will thereby maintain a closed circuit through the conductor-sections and coupling.

The plugs or pieces $d$, of insulating material, may be channeled or grooved at $d'$ at those ends on which the springs $e$ bear, in order to receive the conductor-sections B B', without interfering with the bearing of the springs upon the plugs or pieces of insulating material.

The parts of the coupling-sections whereby they are held in engagement with each other consist of a tongue, $h$, and a hooked flange, $h'$. The tongue, which is of considerable breadth, as best shown in Fig. 3, projects beyond the outer end of the flat face $a$ or $a'$ of the coupling-section, and the hooked flange $h'$, which is at the inner end of the flat face $a$ or $a'$, projects forward or in the same direction as the tongue $h$, and therefore slightly overlaps the flat face $a$ or $a'$ of the coupling-section on which it is formed. The outer side of each tongue $h$, or that face which is most remote from the flat face $a$ or $a'$, is made convex or rounded in form, and the inner side or face of the flange $h'$ is made correspondingly concave or is hooked inward, so as to engage with the tongue $h$, as shown in Fig. 2.

When the two sections of the coupling are to be connected together, they are placed in the position shown in Fig. 4—that is, the section A is placed almost at right angles to the section A', with the contact-pieces $g\ g'$ in face-to-face contact, as shown in Fig. 4. If pressure be now applied to the coupling-sections, the plugs $d$ will yield or move inward, allowing the flat faces $a\ a'$ to come together, and then by turning the section A relatively to the section A' the broad tongue $h$ of each section will be engaged with or turned under the hooked flange $h'$ of the other section, and will thereby securely connect the two sections of the coupling together. The contact-pieces $g\ g'$, by bearing on each other, hold the plugs of insulating material $d$ immovable, and the springs $e$ then act on these plugs as on an abutment, and press the two coupling-sections away from each other in a direction to separate the faces $a\ a'$ and to bring the convex face of each tongue $h$ into strong engagement with the concave or hooked inner face of each flange $h'$. Near the ends of the hooked flanges $h'$, I have represented stop-pins $h^2$, against which the edges of the tongues $h$ strike as the tongues are turned under the hooked flanges, and which permit of the coupling-sections being turned relatively to each other only until they come to the relative positions shown in Fig. 1, or approximately in line with each other.

It will be observed that the shanks or terminal portions $i$ of the coupling-sections A A' extend obliquely in opposite directions to the line of the coupling, and the cable-sections C C' may be connected with the terminal portions $i$ in any suitable manner, as by inserting them through holes $i'$ in such terminal portions and turning inward or spreading their ends, as shown at $i^2$. It is desirable that the terminal portions or shanks $i$ of the coupling-sections should be inclined in opposite directions, as shown, because then the center of weight in the coupling comes below the points at which the cable-sections are attached thereto, and hence the coupling will be caused to hang in the position shown in Fig. 1, and to return to such position in swinging about as the cars move. This position for the coupling is advantageous, because then any tendency which the coupling-sections have to turn relatively to each other will keep the edges of the tongues $h$ against the stop-pins $h^2$, and hence the coupling-sections will be prevented from turning in a direction to disengage them one from another.

As will be seen best from Fig. 2, the tongues $h$ and hooked flanges $h'$ are so proportioned and situated that when the sections of the coupling are connected and are kept away from each other by the springs $e$, the flat faces $a\ a'$ will be held slightly out of contact. This space between the flat faces $a\ a'$ and the extent to which the tongues $h$ are convexed and the flanges $h'$ are hooked should be so proportioned that if the flat faces $a\ a'$ are brought together in close contact the tongues $h$ may be slid out from under the hooked flanges $h'$ without any turning movement of the sections relatively to each other. In other words, if the conductor-sections of the cars of a train have not been uncoupled before uncoupling the cars, or if the train should be broken in two by the uncoupling of the cars while in motion, the strong pull in opposite directions which will be exerted upon the coupling-sections by the cable-sections C C' will pull the tongues $h$ out from under the hooked flanges $h'$ and automatically disconnect the coupling-sections, the faces $a\ a'$ coming together to permit of this. By affording such provision for the automatic disconnection of the coupling-sections by longitudinal pull, I avoid any damage to the electric circuit or electric signaling apparatus when the cars of a train are uncoupled without first uncoupling the conductor-sections.

The coupling-sections A A' may be made of brass or other suitable material, or composed of vulcanite or other hard compounds.

What I claim as my invention, and desire to secure by Letters Patent, is—

1. The combination, with electric-conductor sections, of a coupling serving only to connect the conductor-sections and composed of two sections of similar form, with which the conductor-sections are connected, and each of which is provided with centrally-arranged electric contact-pieces, said coupling-sections being provided with engaging portions, which hold them coupled, but permit of their separation by a pull in opposite directions, and a spring in each coupling-section supporting the contact-pieces, and serving both to keep said pieces in electric contact and to hold the coupling-sections in engagement, substantially as herein described.

2. The combination, with electric-conductor sections, of a coupling composed of the two sections of similar form, with which the conductor-sections are connected and by which such conductor-sections are maintained in circuit, the coupling-sections being constructed with engaging portions which hold them coupled, but permit of their separation by a pull in opposite directions, and cable-sections, also attached to the coupling-sections, and serving to sustain the weight thereof and relieve the conductor-sections of strain, substantially as herein described.

3. In a coupling serving only to connect electric-conductor sections, the combination of two sections of similar form, each having a flat face and a broad tongue projecting beyond such face, and a hooked flange, $h'$, at the inner end of said face, and spring-supported metallic contact-pieces contained in such coupling-sections, to which electric-conductor sections are to be connected, and which serve both to maintain electric contact between the metallic contact-pieces and to hold said tongues and hooked flanges in engagement, substantially as herein described.

4. In a coupling serving only to connect electric-conductor sections, the combination of two sections of similar form, each having a broad tongue, $h$, and a hooked flange, $h'$, and each containing a bore or cavity, $b$, terminating in a shoulder within the coupling-section, plugs $d$, of insulating material, arranged centrally in said bores or cavities and having contact-pieces secured in them, said plugs being movable in said bores or cavities toward and from the shoulders, springs acting upon said plugs, and serving both to preserve the electric contact between the metallic pieces supported by them and to hold the tongues in engagement with the hooked flanges, and plugs or bonnets $c$, closing said bores or cavities and confining said springs and the plugs $d$ within the coupling-sections, substantially as herein described.

FRANK C. PLUME.

Witnesses:
J. S. EASTWOOD,
E. C. STOUGHTON.